March 18, 1952   J. M. HAUSNER, JR   2,589,805
PORTABLE FOLDING BABY CRIB
Filed July 23, 1945   3 Sheets-Sheet 1

FIG_1_

INVENTOR.
JOSEPH M. HAUSNER, JR.
BY Joseph M. Gartner
ATTORNEY

March 18, 1952     J. M. HAUSNER, JR     2,589,805
PORTABLE FOLDING BABY CRIB

Filed July 23, 1945     3 Sheets-Sheet 2

INVENTOR.
JOSEPH M. HAUSNER, JR.
BY Joseph M. Gartner
ATTORNEY

March 18, 1952  J. M. HAUSNER, JR  2,589,805
PORTABLE FOLDING BABY CRIB
Filed July 23, 1945  3 Sheets-Sheet 3
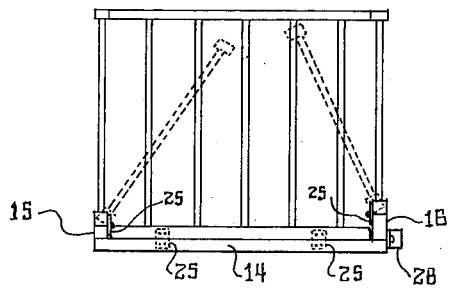
FIG_4_
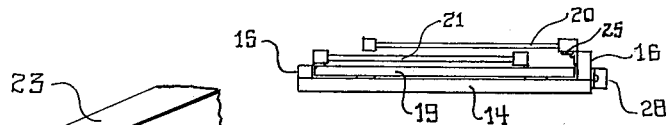
FIG_5_
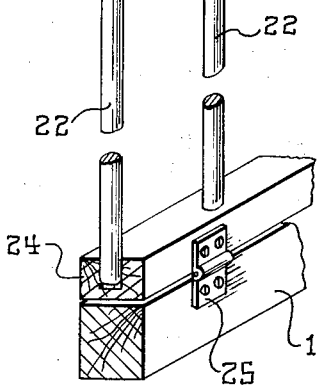
FIG_6_
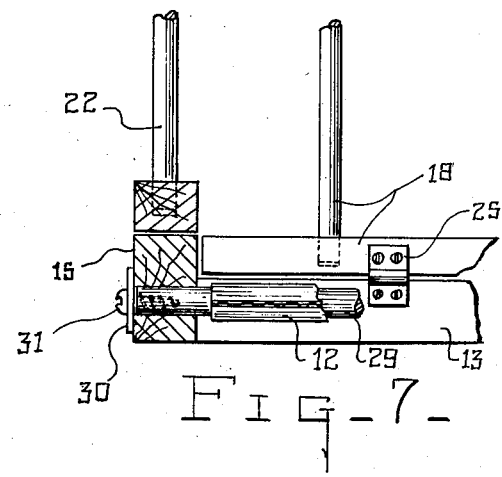
FIG_7_
INVENTOR.
JOSEPH M. HAUSNER, JR.
BY Joseph M. Gartner
ATTORNEY

Patented Mar. 18, 1952

2,589,805

UNITED STATES PATENT OFFICE 2,589,805

PORTABLE FOLDING BABY CRIB

Joseph M. Hausner, Jr., Berwyn, Ill.

Application July 23, 1945, Serial No. 606,542

1 Claim. (Cl. 5—99)

This invention relates generally to new and useful improvements in baby cribs, and more particularly to portable folding baby cribs of a class that may be folded compactly and readily and easily carried about.

The present portable, collapsible bed top baby crib was invented to meet the demands of the safety and comfort of babies. This crib can be easily and conveniently carried in an auto or from place to place in the home. Heretofore, the mother had to hold the baby in her arms when the parents visited friends and when the baby gets sleepy it is invariably placed on an adult bed to sleep. Beds for adults are generally available wherever one travels, and adaptable arrangements for putting a baby to bed safely in an ordinary adult bed or cot are highly desirable for visiting or traveling families, but have not heretofore been available. There is always the risk of the baby falling off the bed and the risk of soiling the bed or bed spread. A situation such as this is detrimental to the personal mental ease and enjoyment of the parents during any visit.

An object and accomplishment of the invention is to provide a portable folding baby crib adaptable to be placed on a bed, sofa, car seat, or any other similar object having a soft surface thereby to convert the same into a baby crib; and to this end a feature of the invention is to provide a portable folding baby crib comprising in general a base support frame substantially rectangular in shape, foldable side and end wall members hingedly fixed to said frame and adaptable to swing inwardly from a vertical open position to a substantially horizontal folding position, means adaptable to hold said side and end wall members in open position, a bottom sheet of flexible material located within the confines of said base support frame and having a tube formed at each end thereof and each tube being adaptable to receive a rod the ends of which being adaptable to be removably secured to said bottom support frame, said bottom sheet being provided with enough slack to conform to the contours of a baby's body placed in the crib and of a bed mattress or the like upon which the crib may be placed, the weight of the baby's body on the sheet being adaptable to hold the crib in place and preventing the tipping thereof.

The invention seeks, as a further object and accomplishment, to provide a folding baby crib such as contemplated herein and characterized by a combination of parts arranged to more satisfactorily perform the various functions required of them and adapted to provide a compact assembly which will successfully combine the factors of structural simplicity and durability, and yet be inexpensive to manufacture.

Additional objects, features and advantages of the invention disclosed herein will be apparent to persons skilled in the art after the construction and operation are understood from the within description.

It is preferred to accomplish the various objects of this invention and to practice the same in substantially the manner hereinafter fully described and as more particularly pointed out in the appended claims, reference being had to the accompanying drawings which form a part of this specification, wherein:

Figure 4 is an end elevational view of the crib depicted in Figure 1, being taken substantially on the plane of the line 4—4 in Figure 2 and showing in dotted lines the direction of travel of the foldable side members when being moved into their folded positions;

Figure 5 is an end elevational view of the crib depicted in Figure 1 and illustrating the foldable side members in their folded positions;

Figure 1:
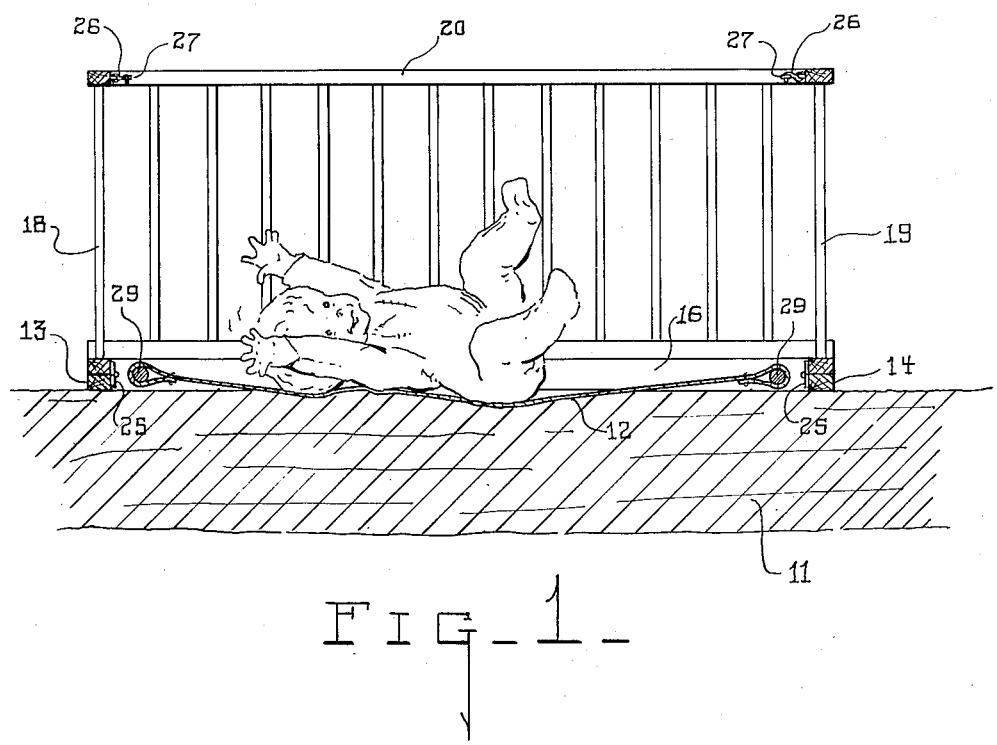
Figure 1 is a longitudinal side elevational view of a portable folding baby crib embodying the features of the invention, being taken substantially on the plane of the line 1—1 in Figure 2 and illustrating the crib as being placed on a bed or the like with a child's body positioned therein.
Figure 2:
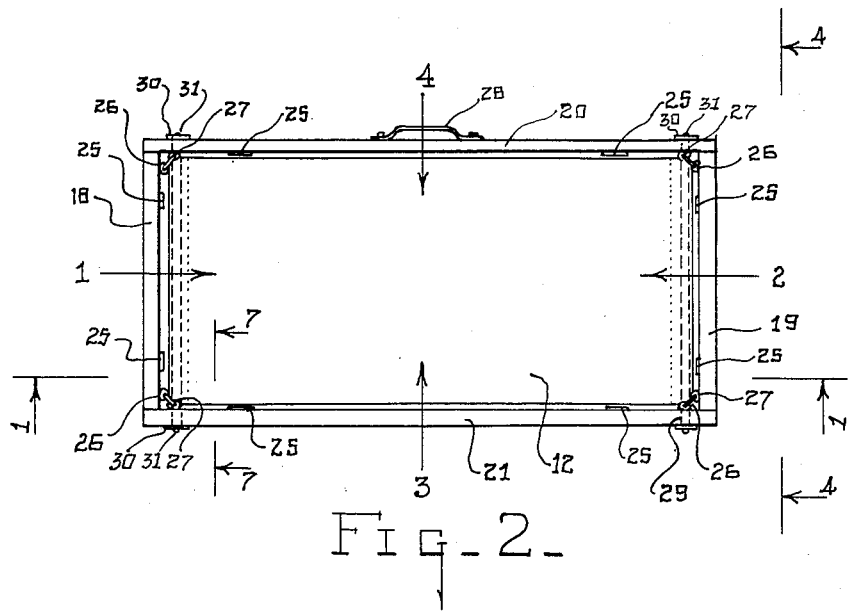
Figure 2 is a top plan view of the portable folding baby crib depicted in Figure 1 and illustrating the sequence of the folding of said side and end members to their folded positions.

Figure 6 is a fragmentary sectional view of a portion of the crib depicted in Figure 1 and illustrating the method of fastening the foldable side members to the base frame and the construction of the foldable side members; and Figure 7 is a fragmentary sectional view of a portion of the crib depicted in Figure 1, being taken substantially on the plane of the line 7—7 in Figure 2 and illustrating the method of securement of the bottom sheet to the base frame.

The drawings are to be understood as being more or less of a schematic character for the purpose of illustrating and disclosing a typical or preferred form of the improvements contemplated herein, and in the drawings like reference characters identify the same parts in the several views.

Referring to the drawings, specifically Fig. 1, I have illustrated the portable folding baby crib with which the subject invention is particularly concerned as being employed in an adjunctive capacity, for example, to a conventional bed, sofa, or other similar soft object designated in its entirety by the numeral 11.

Suffice it to say, since the invention is not particularly concerned with the precise construction of the bed 11, it will not be further described in detail and it is deemed sufficient for all intents and purposes herein contained to show only portions thereof adjacent to and cooperating with said baby crib.

Having thus described the general environment surrounding the foldable baby crib with which the invention is particularly concerned, the specific construction and cooperating functions of the parts of said crib will now be described in detail.

Figure 3:
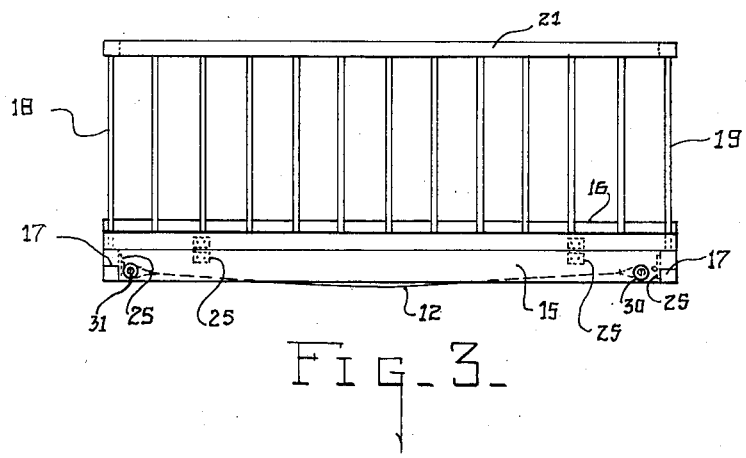
Figure 3 is a longitudinal side elevational view of the crib depicted in Figure 1 and being taken substantially on the plane of the line 3—3 in Figure 2.

In the exemplary embodiment of the invention depicted in Figs. 1, 2, and 3, the crib bottom frame is made up of end members 13 and 14 and side members 15 and 16. The side members 15 and 16 are notched 17 at each end to provide a rigid seat for the end members 13 and 14. The end members 13 and 14 are screwed or nailed at the notches 17 to form a rigid oblong shaped bottom frame for the crib.

Foldable side and end wall members 18, 19, 20, and 21 are provided to keep the baby within the confines of the crib. Referring to Fig. 2 we find numerals 1, 2, 3, and 4 showing the sequence of folding the side and end wall members 18, 19, 20 and 21. The foldable side and end wall members are made with round bars 22 which are supported at each end by square bar rails 23 and 24 as shown in Fig. 6. The foldable side and end wall members are fixed to the crib bottom frame by at least two hinges to each side and each end. The hinges are designated by the numeral 25.

A hook 26 engaging a screw-eye 27 is placed at each corner and fastened to the top square bar rails 23 to hold the side and end wall members in open position when the crib is in use and prevents the foldable members from closing.

When the crib is to be collapsed, the hooks 26 are removed from the screw-eyes 27 and the side and end wall members 18, 19, 20, and 21 are folded in the sequence as shown by the numbers 1, 2, 3, and 4 on Fig. 2 and assume their respective folded positions as shown on Fig. 5. It can be readily seen that, when the crib is in its closed or folded state, it is compact and requires a minimum of room and can be easily carried about by the handle 28 which is fastened to the crib bottom frame member 16, or be conveniently stored in a closet.

The characteristics of wood lending to standardization and easy handling and light weight makes wood preferable in the manufacture of the crib, however, it can also be made of metal or a combination of wood and metal. The crib should be painted in bright and gay colors which will be attractive to the child.

The rubberized bottom sheet 12 is supported in the crib bottom frame at each end only. It has been found desirable to form a tube along the end marginal edges of the rubberized waterproof bottom sheet 12 by hemming the same within which tubes are positioned removable rods 29 which are removably fastened to the side bottom frame members 16 and 17 as shown on Fig. 7.

A washer 30 and a screw 31 is provided at each end of the rods as a means to facilitate the removal of the rods 29 so that the rubberized waterproof bottom sheet 12 can be removed from the crib for purposes of washing or replacement.

It is notable that the bottom sheet 12 may be rubberized and waterproofed and is provided with enough slack so that it will conform with the contours of the bed 11, thereby eliminating the necessity of a separate mattress. An important feature and advantage of the invention is that, when placed in the crib, the baby's own weight will hold the crib down thus preventing any tipping or movement of the crib. The crib may be advantageously employed on the back seat of a car, bed, sofa, or on any other object having a soft surface.

While I have illustrated a preferred embodiment of my invention, many modifications may be made without departing from the spirit of the invention, and I do not wish to be limited to the precise details of construction set forth, but wish to avail myself of all changes within the scope of the appended claim.

Having thus described my invention, what I claim as new and desire to secure by Letters Patent of the United States, is:

In a portable folding baby crib arranged to be placed on a bed or the like to take advantage of the soft mattress support of the bed, a base support frame, a bottom sheet of waterproof flexible material disposed within the confines of said support frame, said flexible material having a tube formed at each end thereof, and said support frame being provided with transverse rods disposed adjacent each end thereof and each rod arranged respectively to be received into one of the tubes, foldable side and end wall members hingedly fixed to said frame and arranged to swing inwardly from a vertical open position to a substantially horizontal folded position, said flexible material being disposed in the frame with the side marginal regions of the flexible material being free from and in spaced relationship with the sides of said support frame and with enough slack to adapt the flexible material to conform to the contours of the baby's body placed in the crib, said arrangement being particularly characterized in utilizing the weight of the baby's body when disposed in the crib to prevent movement of the crib when placed on a bed and in providing the advantage of the soft support of the mattress and yet preventing the soiling of bed covering due to the activities of the baby.

JOSEPH M. HAUSNER, JR.

REFERENCES CITED

The following references are of record in the file of this patent:

UNITED STATES PATENTS

| Number | Name | Date |
| --- | --- | --- |
| 136,280 | Tarbell et al. | Feb. 25, 1873 |
| 654,221 | Brodeur | July 24, 1900 |
| 750,805 | Campbell | Feb. 2, 1904 |
| 775,181 | Kent | Nov. 15, 1904 |
| 837,278 | Bogardus | Dec. 4, 1906 |
| 1,463,459 | Comstock | July 31, 1923 |
| 1,782,217 | Stoddard | Nov. 18, 1930 |
| 2,247,598 | Bohlen | July 1, 1941 |

FOREIGN PATENTS

| Number | Country | Date |
| --- | --- | --- |
| 19,531 | Great Britain | Aug. 29, 1931 |